United States Patent [19]

Seidel

[11] Patent Number: 4,685,445
[45] Date of Patent: Aug. 11, 1987

[54] SOLAR HEATER

[76] Inventor: Pessach Seidel, 1 Rashba Street, Jerusalem, Israel

[21] Appl. No.: 838,627

[22] Filed: Mar. 12, 1986

[51] Int. Cl.$^4$ .................................................. F24J 3/02
[52] U.S. Cl. ...................................... 126/434; 126/437
[58] Field of Search .............. 126/434, 437, 433, 418, 126/419, 420, 448; 237/1 R, 56, 59; 165/60, 106

[56] References Cited

U.S. PATENT DOCUMENTS 4,567,878 2/1986 Larkin ................................. 126/434

FOREIGN PATENT DOCUMENTS 8303984 6/1985 Netherlands ........................ 126/434

Primary Examiner—Henry A. Bennet
Attorney, Agent, or Firm—McAulay, Fields, Fisher, Goldstein & Nissen

[57] ABSTRACT

A thermosyphonic solar heater including a solar collector for heating a liquid by solar radiation, the collector having an inlet socket and an outlet socket, a tank into which the heated liquid is transferred by thermosyphonic action, a hot-liquid, outlet pipe leading from said outlet socket to the top region of the tank and a cold-liquid, return pipe leading from the bottom region of the tank to the inlet socket. The hot-liquid pipe having a downwardly extending portion ending at, and opening into, the top region, and the cold return pipe having an upwardly extending portion beginning at, and open towards, the bottom region, and a downwardly extending portion. The upper end of the upwardly extending portion of the return pipe communicates with the upper end of the downwardly extending portion. A part of the upwardly extending portion of the return pipe is in at least indirect thermal contact with at least some of the liquid inside the downwardly extending portion of the hot-liquid pipe and inside the storage tank, whereby forward thermosyphonic circulation is produced when the collector is heated by solar radiation, but reverse circulation is substantially inhibited when the collector cools down in absence of solar radiation.

20 Claims, 12 Drawing Figures

SOLAR HEATER

The present invention refers to a thermosyphonic solar heater of the type comprising a collector and a storage tank.

While solar heaters have been an undisputed boon to the foreign-currency reserves in general and to the pockets of the individual users in particular, they have also been, and still are, an equally undisputed disaster from an aesthetic point of view. The main offenders in this respect are not so much the collectors which on slated roofs are less obstrusive, and on flat roofs can be hidden from sight by a relatively low wall, but the storage tanks, precariously perched on thin legs and sticking out high above everything else like so many sore thumbs. The reason for this deplorable state of affairs is simply the physics of the conventional solar-heater design, in which the cold-water return pipe which leads the water from the tank back to the lower end of the collector, is attached to the bottom, or a point close to the bottom, of the tank. It can be shown by a very simple calculation, and has of course been proved in practice, that, in such a design, the bottom of the storage tank must be located at a level higher than that of the top of the collector, as otherwise reverse circulation will occur, that is, in the absence of sunshine, and especially during the night, when the water in the collector cools down and becomes colder than the water in the tank, the thermosyphonic action will change direction and hot water accumulated in the tank will start to flow into the collector which now acts as a cooler.

Attempts have been made to get around this basic fact by providing non-return valves which would permit flow in the direction of forward circulation, but would inhibit flow in the undersirable reverse direction. These valves are, however, very unreliable because, due to the very small hydrostatic driving force involved, they have to be very sensitive and are easily fouled by silt, mineral deposits, and the like.

It is one of the objects of the present invention to provide a solar heater in which practically no reverse circulation takes place even when the collector is much colder than the water in the storage tank.

This the present invention achieves by providing a thermosyphonic solar heater comprising a solar collector for heating a liquid by solar radiation, said collector having an inlet socket and an outlet socket, a tank into which said heated liquid is transferred by thermosyphonic action, a hot-liquid, outlet pipe leading from said outlet socket to the top region of said tank and a cold-liquid, return pipe leading from the bottom region of said tank to said inlet socket, said hot-liquid pipe having a downwardly extending portion ending at, and opening into, said top region, and said cold return pipe having an upwardly extending portion beginning at, and open towards, said bottom region, and a downwardly extending portion, the upper end of the upwardly extending portion of said return pipe communicating with the upper end of the downwardly extending portion thereof, wherein a proportion of said upwardly extending portion of said return pipe is in thermal contact with at least some of the liquid inside said downwardly extending portion of said hot-liquid pipe and inside said storage tank, whereby forward thermosyphonic circulation is produced when said collector is heated by solar radiation, but reverse circulation is substantially inhibited when said collector cools down in absence of solar radiation.

The invention further provides a pipe arrangement for a thermosyphonic solar heater including a solar collector for heating liquid by solar radiation, said collector having an inlet socket and an outlet socket and further including a tank into which said heated liquid is transferred by thermosyphonic action, said arrangement comprising a hot-liquid outlet pipe connectable to, and leading from, said outlet socket to the top region of said tank and a cold-liquid, return pipe connectable to, and leading from, the bottom region of said tank and connectable to said inlet socket, said hot-liquid pipe having a downwardly extending portion ending at, and opening into, said top region, and said cold return pipe having an upwardly extending portion beginning at, and open towards, said bottom region, and a downwardly extending portion, the upper end of the upwardly extending portion of said return pipe communicating with the upper end of the downwardly extending portion thereof, wherein for thermal contact a proportion of said upwardly extending portion of said return pipe is in thermal contact with at least a portion of said downwardly extending portion of said hot-liquid pipe.

While the invention will now be described in connection with certain preferred embodiments, it will be understood that it is not intended to limit the invention of these particular embodiments. On the contrary, it is intended to cover all alternatives, modifications and equivalent arrangements as may be included within the scope of the invention as defined by the appended claims. Nevertheless, it is believed that embodiments of the invention will be more fully understood from a consideration of the following illustrative description read in conjunction with the accompanying drawings, in which:

Figure 1:
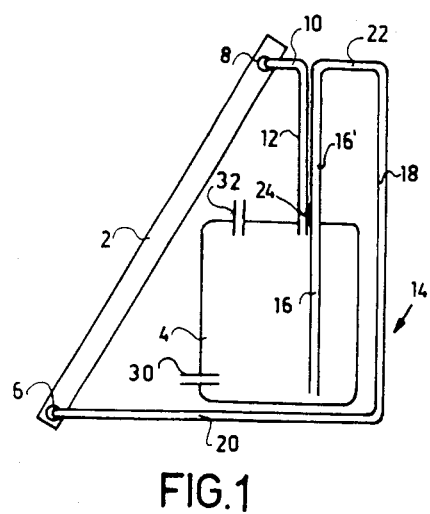
FIGS. 1 to 6 are schematic representations of variants of the solar heater according to the invention.

Referring now to the drawings, there is seen in FIG. 1 a solar heater comprising a solar collector 2 of the wellknown flat-plate type, and a storage tank or reservoir 4 situated behind the inclined collector 2 and, as can be seen, lower than the latter. The collector 2 has an inlet socket 6 at its lower end, and an outlet socket 8 at its upper end. The collector 2 is connected to the tank 4 by means of a hot-water pipe 10 leading, in direction of forward thermosyphonic circulation, from the outlet socket 8 to the top region of the tank 4, and by a cold-water, return pipe 14 leading from the bottom region of the tank 4 to the inlet socket 6. The hot-water pipe 10 has a downwardly extending portion 12 which ends at, and opens into, the top region of the tank 4, and the return pipe 14 has an upwardly extending portion 16, 16' beginning at, and open towards, the bottom region, and a downwardly extending portion 18, the lower end of which is connected to the inlet socket 6 by means of a substantially horizontal pipe section 20. The upper ends of these two portions 16 and 18 are connected to one another by a short piece of pipe 22.

Further seen in FIG. 1 is a cold-water feeding line 30 and a hot-water consumer line 32.

The central feature of the design according to the present invention consists of the fact that the upwardly extending, or "riser" portion 16, 16′ of the return pipe 14 is in thermal contact with the water in the tank 4 (portion 16) and with the downwardly extending or "down" portion 12 of the hot-water pipe 10 (portion 16′). This contact is facilitated in the tank 4 by the water surrounding the portion 16 and beyond the tank 4 by heat-transfer means which, in this particular embodiment, takes the form of a number of welding spots 24, indicated by cross-hatching, which, thermally, unite the portions 12 and 16′. Due to this heat-transfer arrangement, there will be a tendency towards an equalization of temperature of the water inside the riser portion 16, 16′ with that of the water in the tank 4 and in the hot-water pipe portion 12, respectively. During periods of sunshine, water in the collector 2 heats up, producing a thermal inbalance with respect to the colder water coming from the bottom region of the tank 4 and flowing in the return pipe portion 18. This inbalance results in a difference of weight between the water column represented by the collector 2 and that constituted by the return pipe portion 18, and produces the thermosyphonic flow from the collector 2 via the outlet socket 8 and the hot-water pipe 10 into the tank 4.

In the absence of solar radiation, and particularly during the hours of night, the collector 2 and return pipe portin 18 are at a substantially equal temperature, and since due to the above-explained arrangement the temperature of the water inside the hot-water pipe portion 12 and the tank 4 is now substantially equal to the temperature of the water inside the pipe portions 16 and 16′, the entire system is now in thermal equilibrium, causing a virtual stoppage of all circulation, including reverse circulation.

Figure 2:
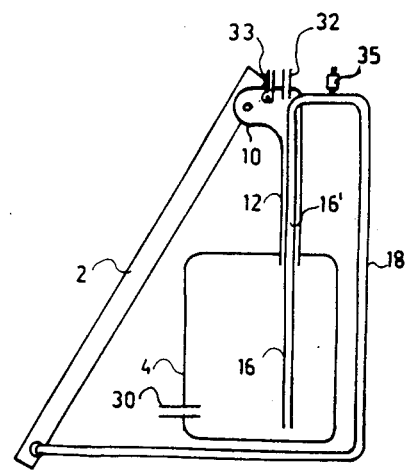

In the variant represented in FIG. 2, the temperature-equalizing arrangement is realized in a different way: the hot-water pipe 10 is of a diameter large enough to accommodate also the riser portion 16′. Thermal coupling in this case is effected not by the welding spots as in the embodiment of FIG. 1, but by the water inside the hot-water pipe portion 12, which surrounds the riser portion 16′.

There is also seen in the figure an electric back-up heater 33 and an air valve 35, which are known per-se and used in other known solar collector heaters. These optional features could be added to all embodiments shown.

Figure 3:
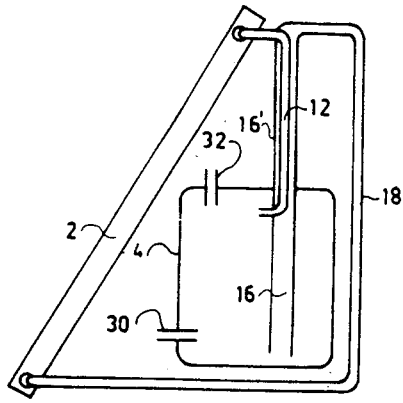

An equivalent, but opposite, arrangement can be seen in the variant of FIG. 3, where it is the riser pipe 16. 16′ that has a larger diameter, accommodating the hot-water pipe portion 12 in its inside.

Figure 4:
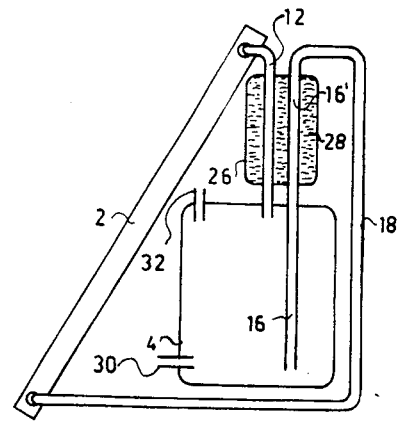

In the embodiment of FIG. 4 thermal coupling is effected by a thermally conducting intermediary 26, e.g., oil, or surrounding the portions 12 and 16′, and being accommodated in a container 28.

Another suitable heat-transfer substance would be a thermally conductive grease.

While in the embodiment so far described the required thermal contact between the hot-water portion 12 and the return-pipe portion 16′ was realized by means of welding spots (FIG. 1), by nesting of the above pipe portions 12 and 16 (FIGS. 2, 3) or by means of a special heat-transfer liquid (FIG. 4), an adequate equalization effect is also obtained by the indirect thermal contact between the pipes 12 and 16′ via the hot water mass in the upper part of the tank 4 and the upper portion of pipe 16, which causes the temperature in pipe 16′ to rise up to that of pipe 12 relatively quickly, resulting in the above-explained stoppage of all thermosyphonic circulation.

Figure 5:
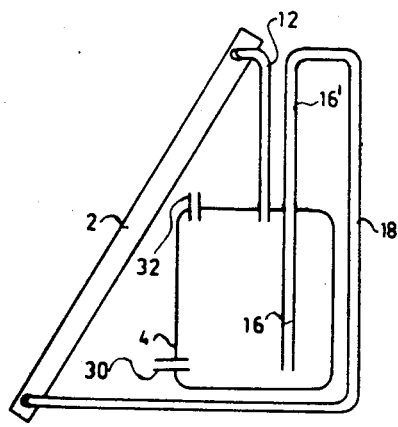

Such an arrangement is shown in FIG. 5, where the hot-water portion 12 and the return-pipe portion 16′ are seen to be distanced from each other, temperature equalization taking place as explained above. In both the tank and the pipes 12, 16′ are made of metal, some heat exchange of course takes place across the portion of the top wall of the tank to which these pipes are joined.

Figure 6:
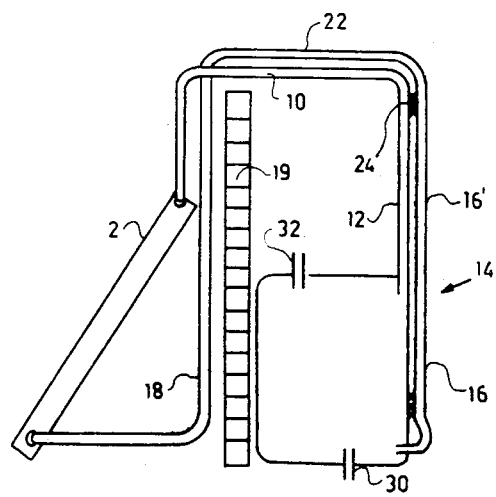

In the variant shown in FIG. 6, the entire length of the riser pipe 16 is on the outside, its lower portion 16 welded for thermal coupling to the tank, its upper portion 16′ welded to the hot-water pipe portion 12. It can be seen that the hot-water pipe 10 and the cold-water, return pipe 14 can be led high above the upper end of the collector 2, in order, for instance to circumvent an obstacle such as, e.g., a wall 19, provided the temperature equaling thermal coupling, in this case the welding spot 24, continues up to the horizontal portions 10 and 22.

Figure 7:
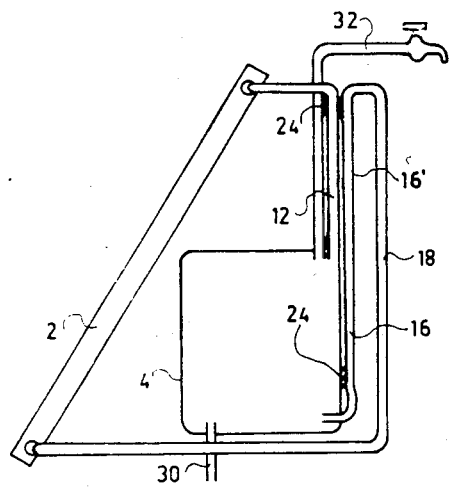
FIGS. 7 to 9 show different locations and points of attachment of the cold-water feed line and the hot-water consumer line.
Figure 8:
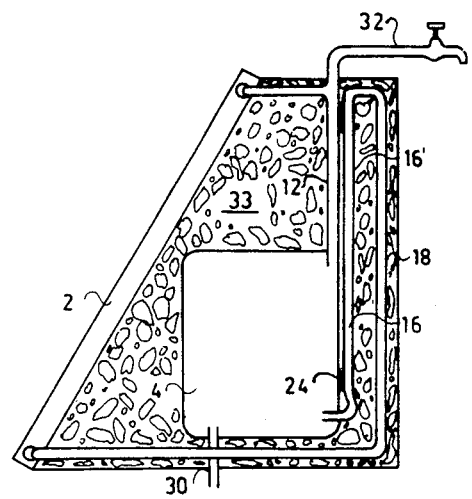
Figure 9:
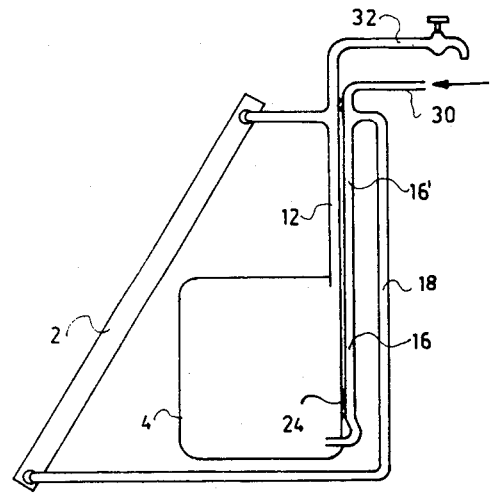

FIGS. 7, 8 and 9 represent an embodiment similar to that shown in FIG. 6, to demonstrate different ways of locating and attaching the cold-water feed lines and hot-water consumer lines.

While in FIG. 7, the feed line 30 enters the bottom region of the tank 4 in the conventional manner from below, the hot, consumer line 32 enters the tank 4 from the top and extends along the pipe portion 12, to which it may also be welded for an added increase in the temperature of the hot water supplied.

In the variant shown in FIG. 8, the consumer line 32 is directly attached to the upper end of the downwardly extending hot-water pipe portion 12, whereby moderate quantities of hot water can be obtained after relatively very short periods of insulation.

While in the rest of the drawings the essential thermal insulation of the tank and of all hot-water carrying pipes has been omitted for the sake of clarity, the embodiment of FIG. 8 shows a special type of insulation, in which the solar heater is totally embedded in the insulating material (except, of course, the radiation-receiving surface of the collector 2). The insulating mass, 33 preferably polyurethane foam or the like, is advantageously protected by a suitable jacket (not shown) and not only improves the efficiency of the solar heater by reducing heat losses to a minimum, but also reduces installation costs.

The embodiment of FIG. 9 is similar to that of FIG. 8, except that the cold-water feed line 30 has been directly attached to the upper end of the riser pipe portion 16′. In this way the incoming cold feed water is preheated prior to its entering the tank 4.

Figure 10:
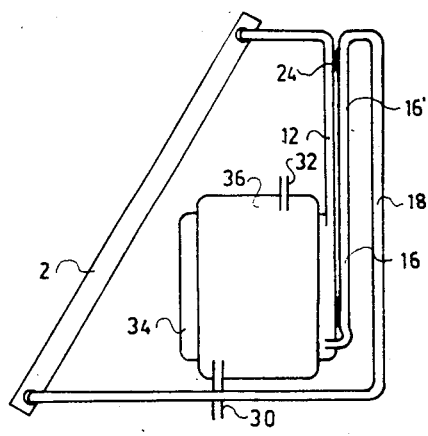
FIG. 10 shows a heat-exchanger arrangement in which a working liquid heats a consumer liquid via a jacket-type heat exchanger.

In the embodiment of FIG. 10, a distinction is made between the circulating working liquid, and the consumer liquid. In arctic regions, for instance, where brilliant sunshine is often accompanied by subzero temperatures, the only possibility of using a solar heater is to use a working liquid having a low freezing point and heat the water via a heat exchanger. In the embodiment of FIG. 10, the previous hot-water storage tank 4 is now a heat exchanger in the form of a jacket 34 surrounding the consumer-liquid tank 36. The arrangement of the pipes 12, 16, 16' as well as the thermal coupling is the same as in the embodiment of FIG. 6.

Figure 11:
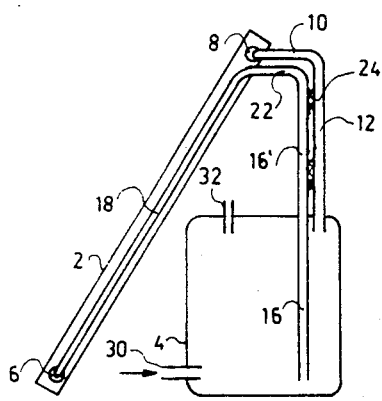
FIG. 11 illustrates a variant in which the downwardly extending portion of the return pipe is disposed inside the collector housing.

In the embodiment shown in FIG. 11, the horizontal limb 20 of the return pipe 14 (FIG. 1), is dispensed with by leading the downwardly extending portion 18 of the return pipe into the collector housing and connecting its lower end to the inlet socket 6. This makes installation far easier.

Figure 12:
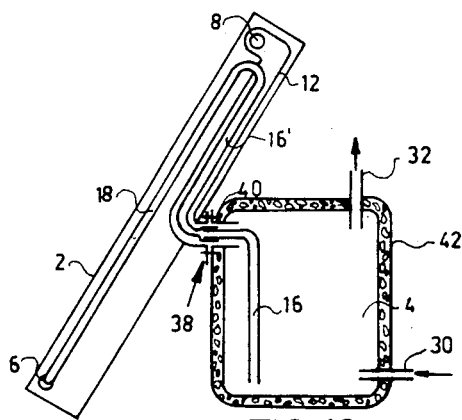
FIG. 12 shows an embodiment in which also the hot-water pipe is disposed inside the collector housing.

Still simpler is the installation of the embodiment of FIG. 12, which resembles the embodiment of FIG. 2 in that here, too, the upper portion 16' of the riser pipe is led through the hot-water pipe 12 which, in its turn, is introduced into the housing of the collector 2. Connection between the hot-water pipe 12 and the tank 4 is facilitated by a pair of flanges 38, and connection between the riser pipe portions 16 and 16' is effected by a "plug-in" type of joint 40 which need not be particularly tight, as there is no difference in pressure between the inside of the portions 16, 16' and the outside thereof. As in the embodiment illustrated in FIG. 11, the downwardly extending portion 18 of the return pipe is located in the collector housing, its lower end being connected to the inlet socket 6. The tank 4 may be insulated with suitable material and jacket 42.

When the above-described thermal contacts are sufficient to ensure temperature equalization at the proper rate, the respective heights of pipes 12, 16' will be substantially equal. Insufficient thermal contacts are, however, liable to produce temperature differences in the liquids inside these pipes, resulting in differences of head that may cause undesirable reverse circulation. Such problems may be overcome by lengthening or shortening one of these pipes.

In spite of the fact that the present invention as described hereinbefore is particularly designed and proved to be of advantage for solar liquid heaters wherein the storage tank is located at a level below that of the top of the collector, it is also within the ambit of the present invention to provide arrangements wherein the storage tank is located at least partly above the level of the top of the collector, as known per-se. This more conventional disposition of the solar liquid heaters' components combined with the pipe arrangement according to the present invention has also certain advantages.

The tank and pipes of the solar heaters described may be made of metal, plastics or any other material, or any combination thereof.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A thermosyphonic solar heater comprising a solar collector for heating a liquid by solar radiation, said collector having an inlet socket and an outlet socket, a tank into which said heated liquid is transferred by thermosyphonic action, a hot-liquid, outlet pipe leading from said outlet socket to the top region of said tank and a cold-liquid, return pipe leading from the bottom region of said tank to said inlet socket, said hot-liquid pipe having a downwardly extending portion ending at, and opening into, said top region, and said cold return pipe having an upwardly extending portion beginning at, and open towards, said bottom region, and a downwardly extending portion, the upper end of the upwardly extending portion of said return pipe communicating with the upper end of the downwardly extending portion thereof, wherein a proportion of said upwardly extending portion of said return pipe is in at least indirect thermal contact and heat exchange relationship with at least some of the liquid inside said downwardly extending portion of said hot-liquid pipe and inside said storage tank, whereby forward thermosyphonic circulation is produced when said collector is heated by solar radiation, but reverse circulation is substantially inhibited when said collector cools down in absence of solar radiation.

2. The solar heater as claimed in claim 1, wherein for thermal contact at least a small portion of the upwardly extending portion of said return pipe is longitudinally welded to the downwardly extending portion of said hot-liquid pipe.

3. The solar heater is claimed in claim 2, wherein for thermal contact at least a small portion of the rest of the upwardly extending portion of said return pipe is longitudinally welded to the outside surface of said tank.

4. The solar heater as claimed in claim 1, wherein for thermal contact a substantial proportion of said upwardly extending portion of said return pipe passes axially through the interior of said downwardly extending hot-liquid pipe.

5. The solar heater as claimed in claim 1, wherein for thermal contact said downwardly extending portion of said hot-liquid pipe passes axially through the upper part of the upwardly extending portion of said return pipe.

6. The solar heater as claimed in claim 1, wherein the hot-liquid consumer line extends from the top region of said tank upwards and is in thermal contact with said downwardly extending hot-liquid pipe.

7. The solar heater as claimed in claim 1, wherein the hot-liquid consumer line is attached to the upper end of said downwardly extending hot-liquid line.

8. The solar heater as claimed in claim 1, wherein the cold-liquid feed line is attached to the upper end of the upwardly extending portion of said return pipe.

9. The solar heater as claimed in claim 1, further comprising a reservoir for a consumer liquid, wherein said tank is a heat exchanger through which circulates thermosyphonically a working liquid heated by said collector, said heat exchanger having the form of a jacket surrounding said reservoir.

10. The solar heater as claimed in claim 1, wherein said downwardly extending portion of said return pipe is disposed inside the housing of said collector, and its lower end is connected to said inlet socket.

11. The solar heater as claimed in claim 4, wherein said downwardly extending portion of said hot-liquid pipe is dosposed inside the housing of said collector.

12. The solar heater as claimed in claim 1, wherein the level of the highest point of said tank is below the level of the highest point of said collector.

13. In a thermosyphonic solar heater system including a solar collector for heating a liquid by solar radiation, said collector having an inlet socket and an outlet socket, and further including a tank into which said heated liquid is transferred by thermosyphonic action, an improvement comprising a hot-liquid, outlet pipe connectable to, and leading from, said outlet socket to the top region of said tank and a cold-liquid, return pipe connectable to, and leading from, the bottom region of said tank and connectable to said inlet socket, said hot-liquid pipe having a downwardly extending portion ending at, and opening into, said top region, and said cold return pipe having an upwardly extending portion beginning at, and open towards, said bottom region, and a downwardly extending portion, the upper end of the upwardly extending portion of said return pipe communicating with the upper end of the downwardly extending portion thereof, wherein a proportion of said upwardly extending portion of said return pipe is designed to be, in operation, in thermal contact and heat exchange relationship with at least some of the liquid inside said downwardly extending portion of said hot-liquid pipe and inside said storage tank, whereby forward thermosyphonic circulation is produced when said collector is heated by solar radiation, but reverse circulation is substantially inhibited when said collector cools down in absence of solar radiation.

14. A pipe arrangement for a thermosyphonic solar heater including a solar collector for heating liquid by solar radiation, said collector having an inlet socket and an outlet socket and further including a tank into which said heated liquid is transferred by thermosyphonic action, said arrangement comprising a hot-liquid outlet pipe connectable to, and leading from, said outlet socket to the top region of said tank and a cold-liquid, return pipe connectable to, and leading from, the bottom region of said tank and connectable to said inlet socket, said hot-liquid pipe having a downwardly extending portion ending at, and opening into, said top region, and said cold return pipe having an upwardly extending portion beginning at, and open towards, said bottom region, and a downwardly extending portion, the upper end of the upwardly extending portion of said return pipe communicating with the upper end of the downwardly extending portion thereof, wherein for thermal contact a proportion of said upwardly extending portion of said pipe is in thermal contact and heat exchange relationship with at least a portion of said downwardly extending portion of said hot-liquid pipe.

15. The arrangement as claimed in claim 13 wherein said thermal contact is achieved by means of liquid flowing in said pipe portion.

16. A pipe arrangement for a thermosyphonic solar heater including a solar collector for heating liquid by solar radiation, said collector having an inlet socket and an outlet socket and further including a tank into which said heated liquid is transferred by thermosyphonic action, said arrangement comprising a hot-liquid outlet pipe connectable to, and leading from, said outlet socket to the top region of said tank and a cold-liquid, return pipe connectable to, and leading from, the bottom region of said tank and connectable to said inlet socket, said hot-liquid pipe having a downwardly extending portion ending at, and opening into, said top region, and said cold return pipe having an upwardly extending portion beginning at, and open towards, said bottom region, and a downwardly extending portion, the upper end of the upwardly extending portion of said return pipe communicating with the upper end of the downwardly extending portion thereof, wherein for thermal contact during operation, a substantial proportion of said upwardly extending portion of said return pipe and of said downwardly extending hot-liquid pipe pass axially one within the other in heat exchange relationship.

17. The solar heater as claimed in claim 16, wherein the storage tank is situated behind the collector and lower than the top thereof.

18. The solar heater as claimed in claim 1, wherein said hot liquid pipe and said cold water pipe are in heat exchange relationship outside of said tank.

19. The solar heater as claimed in claim 13, wherein said hot liquid pipe and said cold water pipe are in heat exchange relationship outside of said tank.

20. The solar heater as claimed in claim 14, wherein said hot liquid pipe and said cold water are in heat exchange relationship outside of said tank.

* * * * *